(12) United States Patent
Hisada et al.

(10) Patent No.: US 11,091,108 B2
(45) Date of Patent: Aug. 17, 2021

(54) BUMPER REINFORCEMENT MOUNTING STRUCTURE

(71) Applicant: TOYOTA JIDOSHA KABUSHIKI KAISHA, Toyota (JP)

(72) Inventors: Kohei Hisada, Nagoya (JP); Kazuki Ohtake, Toyota (JP); Tetsuo Nuruki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 145 days.

(21) Appl. No.: 16/191,863

(22) Filed: Nov. 15, 2018

(65) Prior Publication Data

US 2019/0176735 A1 Jun. 13, 2019

(30) Foreign Application Priority Data

Dec. 8, 2017 (JP) .............................. JP2017-236474

(51) Int. Cl.
*B60R 19/34* (2006.01)
*B60R 19/24* (2006.01)
*B60R 19/18* (2006.01)

(52) U.S. Cl.
CPC .............. *B60R 19/34* (2013.01); *B60R 19/18* (2013.01); *B60R 19/24* (2013.01); *B60R 2019/1826* (2013.01)

(58) Field of Classification Search
CPC ......... B60R 19/12; B60R 19/18; B60R 19/02; B60R 2021/0011; B60R 19/00; B60R 19/22; B60R 19/24; B60R 19/34; B60R 2019/1873; B60R 19/48

USPC ....... 296/187.11, 203.04, 37.2, 187.09, 37.6, 296/37.16, 3, 25; 293/133, 102, 120, 293/146, 107, 155, 122, 110; 280/784, 280/781, 782, 785, 834
See application file for complete search history.

(56) References Cited

U.S. PATENT DOCUMENTS

| | | | |
|---|---|---|---|
| 6,174,009 B1* | 1/2001 | McKeon | B60R 19/34 188/377 |
| 6,367,869 B1* | 4/2002 | Baccouche | B62D 21/155 280/784 |
| 7,699,347 B2* | 4/2010 | Shoap | B62D 21/15 280/784 |
| 7,931,318 B2* | 4/2011 | Matsumura | B60R 19/24 293/133 |

(Continued)

FOREIGN PATENT DOCUMENTS

| | | |
|---|---|---|
| JP | 2009-73368 A | 4/2009 |
| JP | 4623071 | 2/2011 |
| JP | 2014-101053 | 6/2014 |

*Primary Examiner* — D Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A bumper reinforcement mounting structure includes a plurality of vehicle body skeleton members disposed at an interval in a vehicle width direction and extending in a vehicle front-rear direction, a bumper reinforcement that extends in the vehicle width direction and is mounted on the vehicle body skeleton members, and a first mounting member that is used to mount a mounting portion of the bumper reinforcement on one of the vehicle body skeleton members. The first mounting member has shear strength that is lower than shear strength of the mounting portion of the bumper reinforcement.

18 Claims, 8 Drawing Sheets

(56) References Cited

U.S. PATENT DOCUMENTS

| | | | | |
|---|---|---|---|---|
| 8,016,332 B1* | 9/2011 | Shoap | ............... | B60R 19/30 |
| | | | | 293/132 |
| 8,113,554 B2* | 2/2012 | Shoap | ............... | B60R 19/26 |
| | | | | 293/109 |
| 9,421,856 B2* | 8/2016 | Frank | ............... | B60W 10/06 |
| 9,905,349 B2* | 2/2018 | Park | ............... | H01F 17/04 |
| 2009/0079210 A1 | 3/2009 | Matsumura | | |
| 2014/0138965 A1 | 5/2014 | Kaneko et al. | | |
| 2015/0360632 A1* | 12/2015 | Nishida | ............... | B62D 25/082 |
| | | | | 293/133 |

* cited by examiner

BUMPER REINFORCEMENT MOUNTING STRUCTURE

INCORPORATION BY REFERENCE

The disclosure of Japanese Patent Application No. 2017-236474 filed on Dec. 8, 2017 including the specification, drawings and abstract is incorporated herein by reference in its entirety.

BACKGROUND

1. Technical Field

The disclosure relates to a bumper reinforcement mounting structure.

2. Description of Related Art

In Japanese Unexamined Patent Application Publication No. 2014-101053 (JP 2014-101053 A), a bumper reinforcement is disclosed. The bumper reinforcement is formed by bending a metal sheet with yield strength of 980 MPa or higher but not exceeding 1470 MPa.

SUMMARY

A bumper reinforcement is fastened to side members or crush boxes serving as vehicle body skeleton members by using bolts and nuts. When a relatively low collision load is input to the bumper reinforcement, the collision load is transmitted to the side members or the crush boxes from the bumper reinforcement.

Meanwhile, when a relatively high collision load is input to the bumper reinforcement, a bolt fastening portion of the bumper reinforcement could break and make the bumper reinforcement split up. In particular, when the bumper reinforcement used is made of a high tensile strength steel sheet or an aluminum member with tensile strength of 340 MPa or higher, ductility is low. Therefore, it becomes more likely that the bumper reinforcement is split up at the bolt fastening portion at the time of collision. When the bumper reinforcement is split up at the bolt fastening portion, a load transmitted to the side members or the crush boxes becomes smaller in comparison with a case where the bumper reinforcement is not split up.

Thus, in a configuration in which the bumper reinforcement made of a high tensile strength steel sheet or an aluminum member is used, there is room for improvement to restrain a reduction of a collision load transmitted to the vehicle body skeleton members from the bumper reinforcement at the time of collision.

The disclosure provides a bumper reinforcement mounting structure in a configuration including a bumper reinforcement made from a high tensile strength steel sheet or an aluminum member. The bumper reinforcement mounting structure is able to restrain a reduction of a collision load transmitted to a vehicle body skeleton member from the bumper reinforcement at the time of collision.

A first aspect of the disclosure provides a bumper reinforcement mounting structure. The bumper reinforcement mounting structure includes a plurality of vehicle body skeleton members, a bumper reinforcement, and a first mounting member. The vehicle body skeleton members are disposed at an interval in a vehicle width direction and extend in a vehicle front-rear direction. The bumper reinforcement extends in the vehicle width direction and is mounted on the vehicle body skeleton members. The first mounting member is used to mount the bumper reinforcement on one of the vehicle body skeleton members. The first mounting member is broken earlier than a mounting portion of the bumper reinforcement mounted on the plurality of vehicle body skeleton members when a collision load is input to the bumper reinforcement.

According to the first aspect, a collision load that is input to the bumper reinforcement at the time of collision acts on the mounting portion of the bumper reinforcement that is mounted on the vehicle body skeleton member. Because the mounting member is broken earlier than the mounting portion of the bumper reinforcement, the mounting portion is restrained from being broken due to contact with the mounting member. Therefore, not only a transmission path of the collision load to the vehicle body skeleton member on one side from the bumper reinforcement, but also a transmission path of the collision load to the vehicle body skeleton member on the other side is ensured. Thus, it is possible to restrain a reduction of the collision load transmitted to the vehicle body skeleton members from the bumper reinforcement at the time of collision.

A second aspect of the disclosure provides a bumper reinforcement mounting structure. The bumper reinforcement mounting structure includes a plurality of vehicle body skeleton members, a bumper reinforcement, and a first mounting member. The vehicle body skeleton members are disposed at an interval in a vehicle width direction and extend in a vehicle front-rear direction. The bumper reinforcement extends in the vehicle width direction and is mounted on the vehicle body skeleton members. The first mounting member is used to mount a mounting portion of the bumper reinforcement on one of the vehicle body skeleton members. The first mounting member has shear strength that is lower than shear strength of the mounting portion of bumper reinforcement.

According to the second aspect, a collision load input in the bumper reinforcement at the time of collision acts on the mounting portion of the bumper reinforcement that is mounted on the vehicle body skeleton member. Since the shear strength of the mounting member is lower than the shear strength of the mounting portion of the bumper reinforcement, the mounting member is broken earlier than the mounting portion of the bumper reinforcement. In other words, the mounting portion is restrained from being broken due to contact with the mounting member. Therefore, not only a transmission path of the collision load to the vehicle body skeleton member on one side from the bumper reinforcement, but also a transmission path of the collision load to the vehicle body skeleton member on the other side is ensured. Thus, it is possible to restrain a reduction of the collision load transmitted to the vehicle body skeleton members from the bumper reinforcement at the time of collision.

In the bumper reinforcement mounting structure according to the first and second aspects, the first mounting member may include a first bolt. The mounting portion may have a hole that the first bolt is inserted.

With the configuration, by inserting the bolt in the hole in the mounting portion of the bumper reinforcement, the bumper reinforcement is mounted on the vehicle body skeleton member. Therefore, the configuration of the mounting member becomes simple.

In the bumper reinforcement mounting structure according to the first and second aspects, an expression $Fa \times Na \times S < Fb \times Nb \times 2 \times L \times t$ may be satisfied when $Fa$ is material strength of the first bolt, $Na$ is a ratio of shear strength of the first bolt, S is an effective sectional area of the first bolt, Fb is material strength of the bumper reinforcement, Nb is a ratio of shear strength of the bumper reinforcement, L is a length of the mounting portion of the bumper reinforcement, and t is a plate thickness of the bumper reinforcement.

With the configuration, based on the expression Fa×Na×S<Fb×Nb×2×L×t, the shear strength of the bolt is controlled so as to be smaller than the shear strength of the mounting portion of the bumper reinforcement. Thus, it is possible to ensure that the bolt is broken earlier than the mounting portion of the bumper reinforcement at the time of collision.

The bumper reinforcement mounting structure according to the first and second aspects may further include a second mounting member that is used to mount the bumper reinforcement on the one of the vehicle body skeleton members and has a second bolt. The one of the vehicle body skeleton members may include a first mounted portion positioned on an inner side in the vehicle width direction with respect to a center of the mounting portion of the bumper reinforcement in the vehicle width direction, and a second mounted portion positioned on an outer side in the vehicle width direction with respect to the center of the mounting portion of the bumper reinforcement in the vehicle width direction. First shear strength of the first bolt may be lower than second shear strength of the second bolt. The bumper reinforcement may be mounted on the first mounted portion by the first bolt, and may be mounted on the second mounted portion by the second bolt.

With the configuration, the second shear strength of the second bolt is higher than the first shear strength of the first bolt. Therefore, even when the first bolt is broken at the time of collision, the second bolt is restrained from breaking. Thus, it is possible to ensure that the collision load is transmitted to the vehicle body skeleton members from the bumper reinforcement while restraining breakage of the mounting portion of the bumper reinforcement.

In the bumper reinforcement mounting structure according to the first and second aspects, the first shear strength of the first bolt may be lower than the shear strength of the mounting portion of the bumper reinforcement.

In the bumper reinforcement mounting structure according to the first and second aspects, the second shear strength of the second bolt may be higher than the shear strength of the mounting portion of the bumper reinforcement.

With the configuration, the second shear strength of the second bolt is higher than not only the first shear strength of the first bolt but also the shear strength of the mounting portion of the bumper reinforcement. Therefore, even when the first bolt is broken at the time of collision, the second bolt is restrained from breaking. Further, breakage of the second bolt is restrained unless the mounting portion of the bumper reinforcement is broken. Therefore, compared to a configuration in which the first bolt and the second bolt are broken at the time of collision, it is possible to further restrain a reduction of the collision load transmitted to the vehicle body skeleton members from the bumper reinforcement at the time of collision.

In the bumper reinforcement mounting structure according to the first and second aspects, each of the vehicle body skeleton members may include a side member extending in the vehicle front-rear direction, and a crush box that is mounted on a distal end portion of the side member in the vehicle front-rear direction and deformed due to an input of a collision load. The bumper reinforcement may be mounted on the crush box.

With the configuration, the crush box is interposed between the bumper reinforcement and the side member even after the crush box is deformed at the time of collision. Thus, it is possible to reduce shear force acting on the mounting member in comparison with a configuration without the crush box.

In the bumper reinforcement mounting structure according to the first and second aspects, the bumper reinforcement may be made of a high tensile strength steel sheet or an aluminum member.

The disclosure of the first and second aspects has an effect that it is possible obtain a bumper reinforcement mounting structure in a configuration having the bumper reinforcement made of a high tensile strength steel sheet or an aluminum member, the bumper reinforcement mounting structure being able to restrain a reduction of a collision load transmitted to the vehicle body skeleton members from the bumper reinforcement at the time of collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

An example of a bumper reinforcement mounting structure according to the first embodiment is described.

Figure 1:
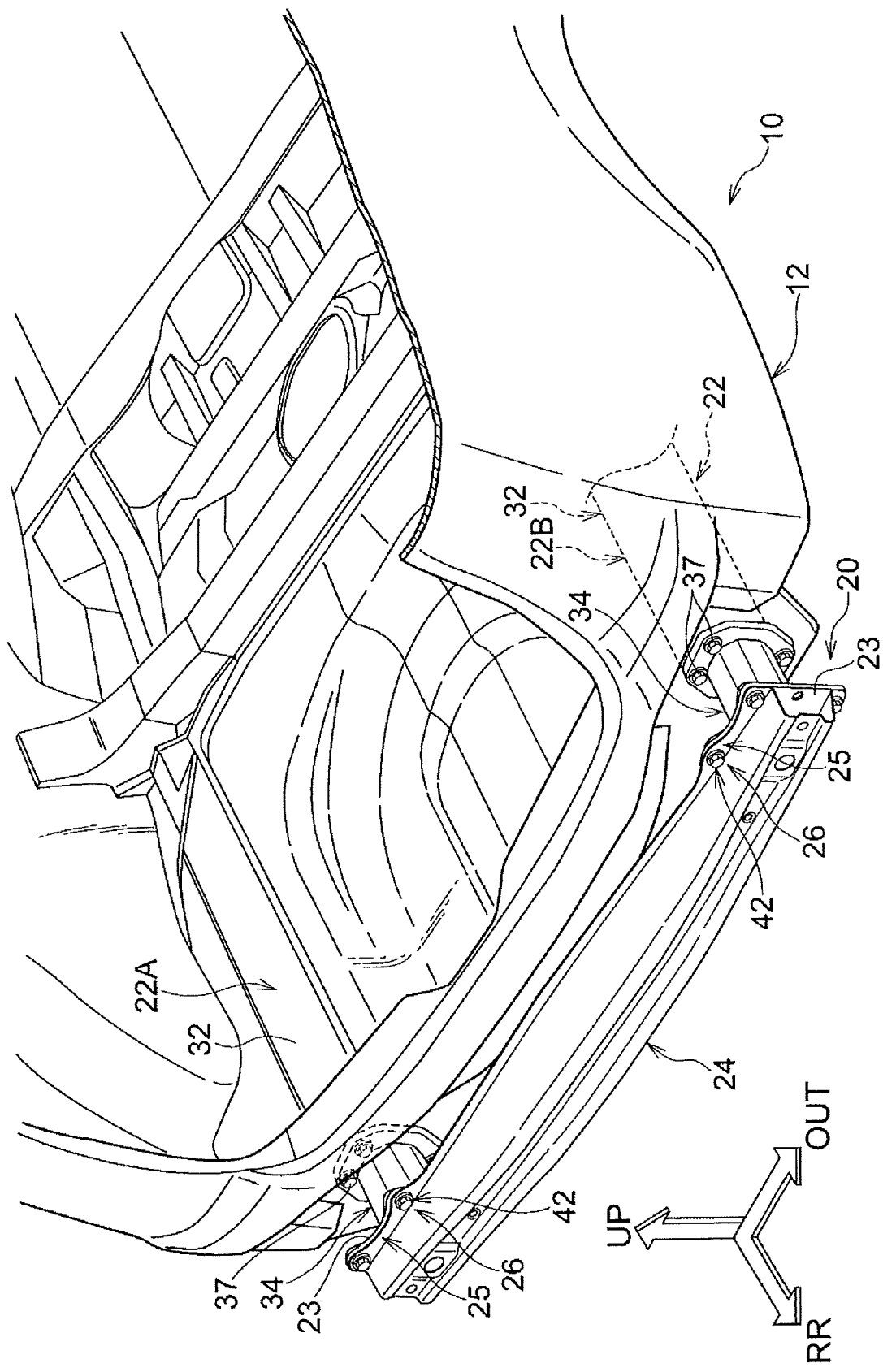
FIG. 1 is a structural view of a rear part of a vehicle to which a mounting structure according to a first embodiment is applied.

FIG. 1 shows a rear part of a vehicle 10. Shown as appropriate in each of the drawings are an arrow RR that indicates a vehicle rear direction (a direction opposite to a traveling direction), an arrow UP that indicates a vehicle upper direction, and an arrow OUT that indicates an outer side in a vehicle width direction. Hereinafter, when description is given by simply using front-rear, upper-lower, and right-left directions, these directions indicate front and rear in a vehicle front-rear direction, upward and downward in a vehicle upper-lower direction, and right and left in the vehicle width direction when facing the traveling direction, respectively, unless otherwise specified.

The vehicle 10 includes a vehicle body 12. Also, a mounting structure 20 as an example of a bumper reinforcement mounting structure is applied to the vehicle 10.

Mounting Structure

The mounting structure 20 includes vehicle body rear members 22 as an example of a plurality of vehicle body skeleton members, a bumper reinforcement 24, and mounting members 26. In this embodiment, as an example, connecting plates 23 are disposed between the vehicle body rear members 22 and the bumper reinforcement 24, respectively.

Vehicle Body Rear Members

The vehicle body rear members 22 configure a rear part and also a part of a lower part of the vehicle body 12. Each of the vehicle body rear members 22 includes a rear side member 32 as an example of a side member, and a crush box 34. To distinguish between the right and left vehicle body rear members 22, the one on the left side (one side) is referred to as the vehicle body rear member 22A, and the one on the right side (the other side) is referred to as the vehicle body rear member 22B. The vehicle body rear members 22A, 22B are disposed at an interval in the vehicle width direction, and extend in the vehicle front-rear direction. Also, the vehicle body rear members 22A, 22B are configured so as to be symmetrical to each other with respect to a center of the vehicle 10 in the vehicle width direction.

Rear Side Members

Figure 3:
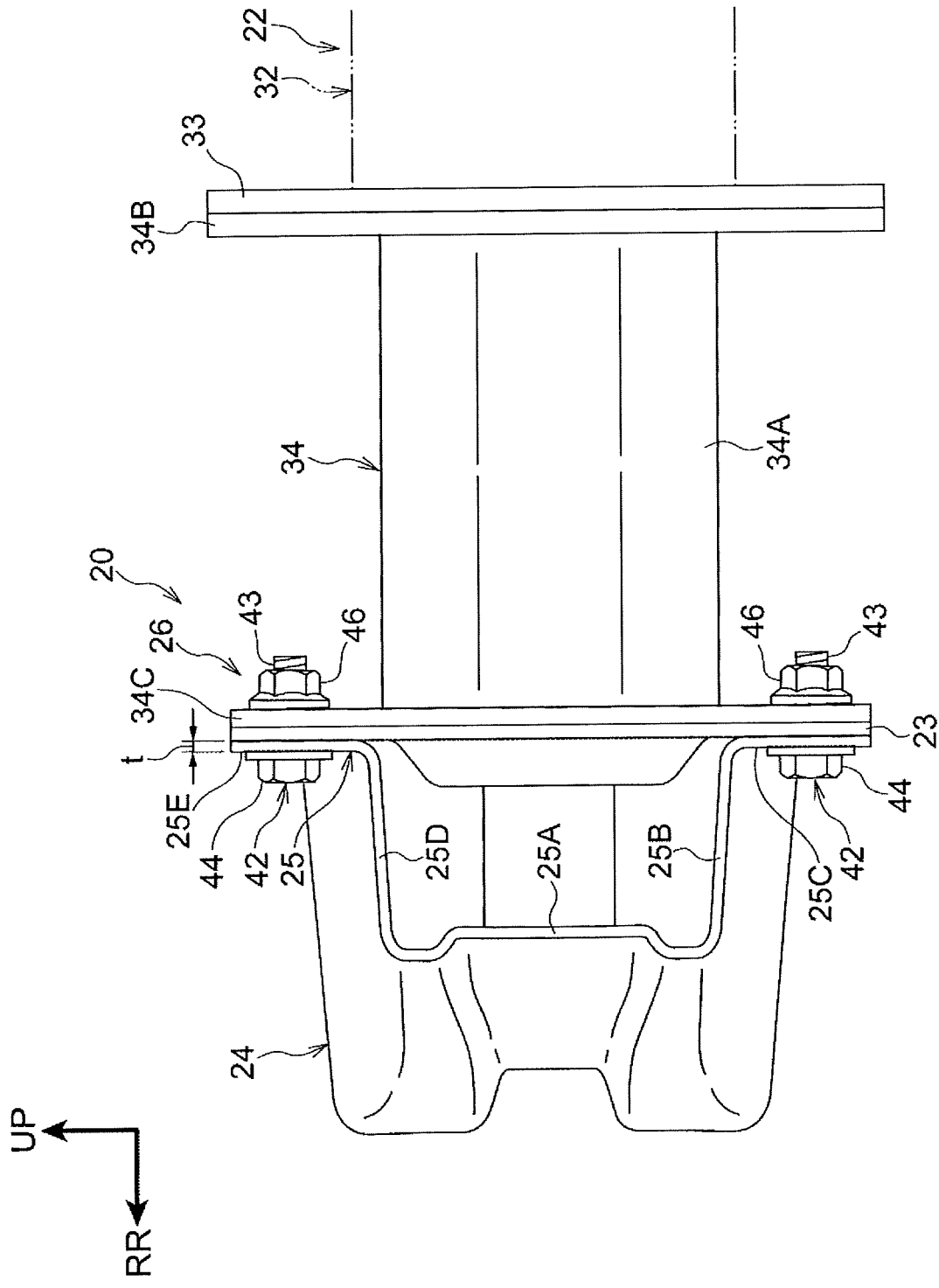
FIG. 3 is an explanatory view of the mounting structure according to the first embodiment, seen from an outer side in a vehicle width direction.

The rear side members 32 are located on the right and the left as a pair, and extend so that the vehicle front-rear direction serves as their axis direction. Each of the rear side members 32 has a configuration with a closed cross-section when seen in the vehicle front-rear direction. In a rear end portion of each of the rear side members 32, a flange portion 33 (see FIG. 3) is formed, projecting in a direction almost orthogonal to the axis direction. Further, at a rear end of each of the rear side members 32, the crush box 34 is provided. FIG. 3 does not show bolts and so on that are used to mount the crush box 34 on the rear side member 32.

Crush Boxes

Figure 4:
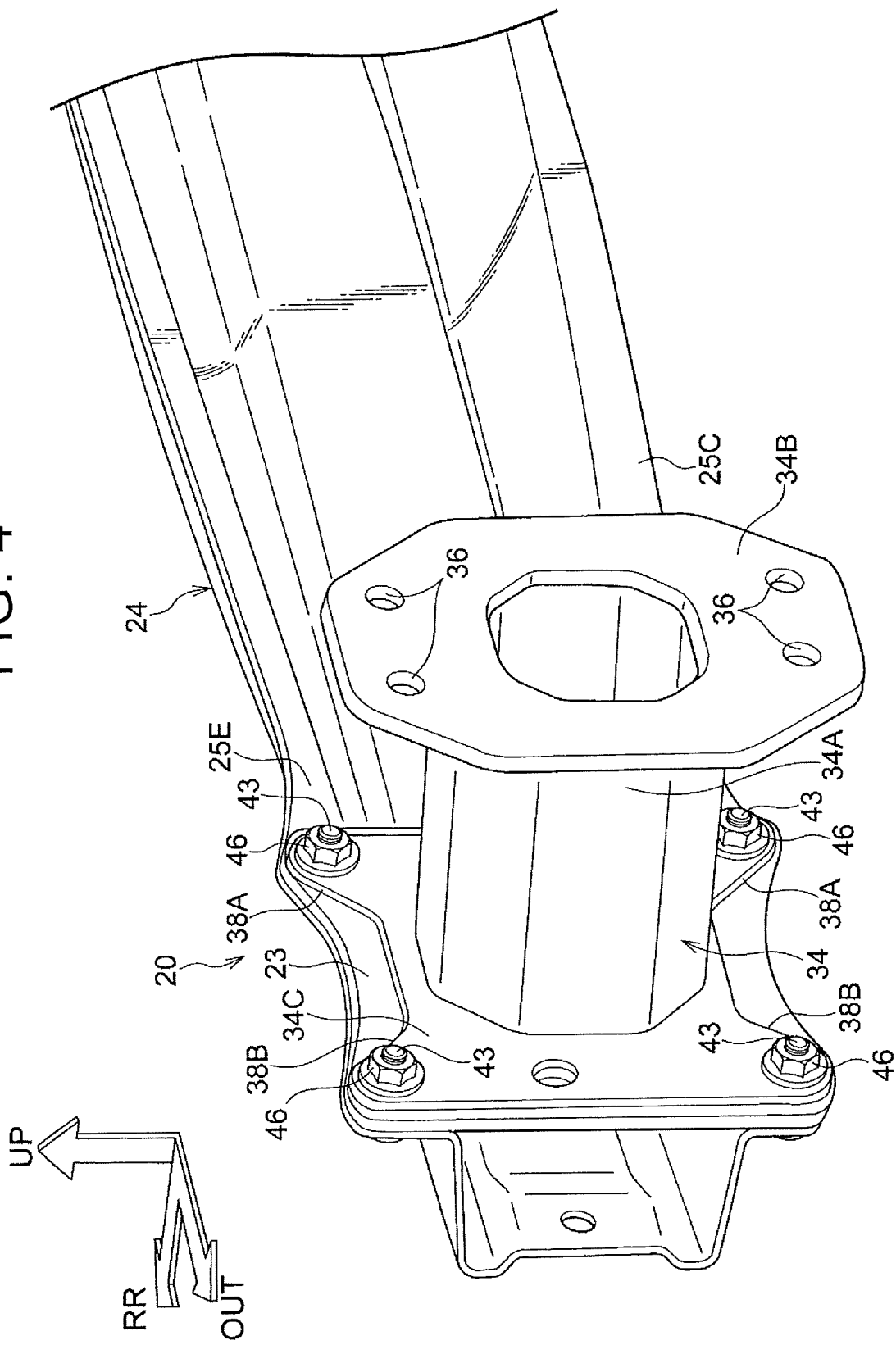
FIG. 4 is an explanatory view of the mounting structure according to the first embodiment, seen from a diagonal front side of the vehicle.

The crush box 34 shown in FIG. 4 has a cylindrical body portion 34A in which the vehicle front-rear direction serves as its axis direction. In the body portion 34A, a deformation starting point such as a bead (not shown) is formed. In a front end portion of the body portion 34A in the vehicle front-rear direction, a flange portion 34B is formed, projecting in a direction almost orthogonal to the axis direction. Also, in a rear end portion of the crush box 34, a flange portion 34C is formed, projecting in a direction almost orthogonal to the axis direction.

In the flange portion 34B, for example, through-holes 36 for fastening are made in the vehicle front-rear direction. Bolts 37 (see FIG. 1) are used to mount the flange portion 34B on the rear end portion (a distal end portion) of the rear side member 32 (see FIG. 1).

Figure 2:
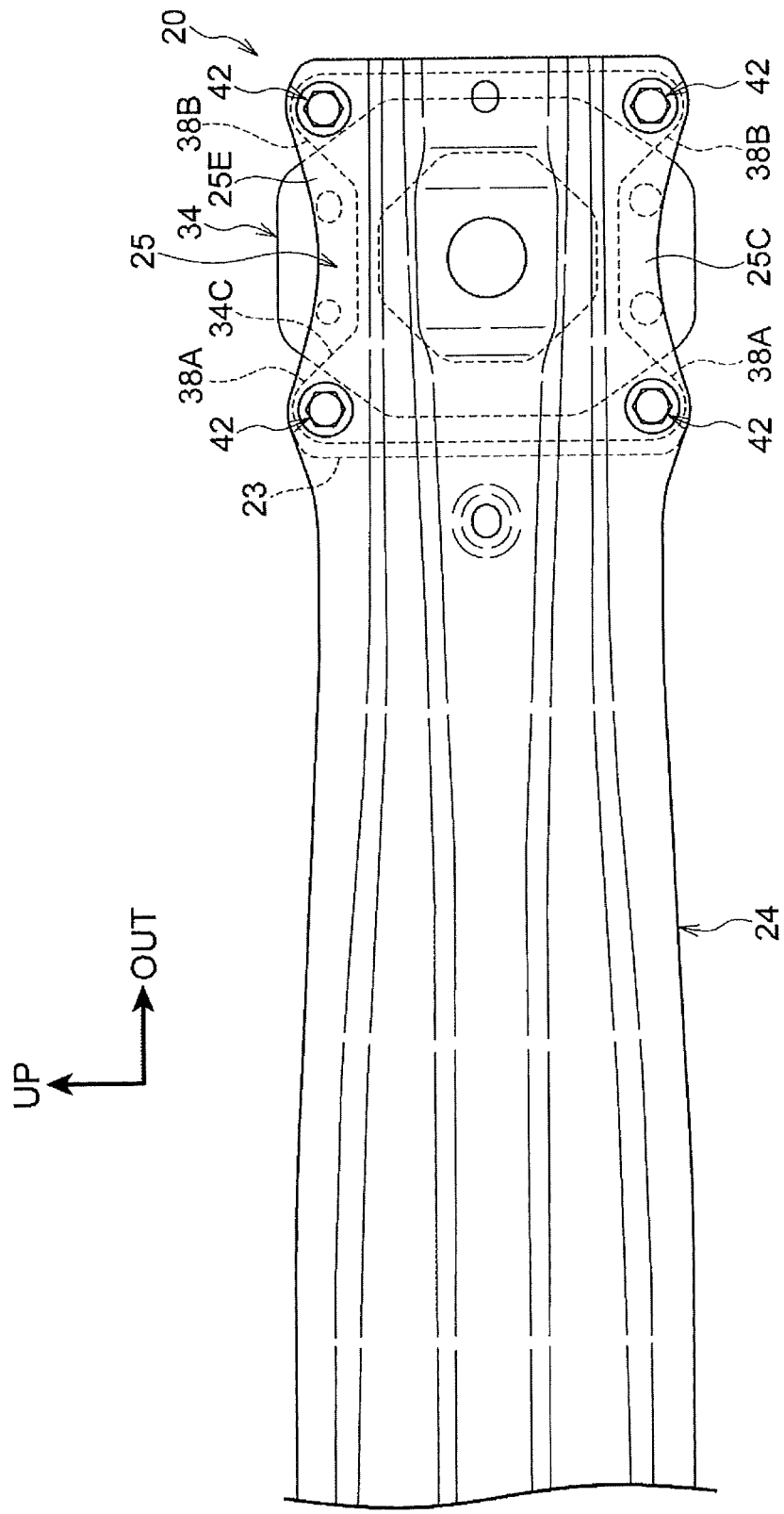
FIG. 2 is an explanatory view of the mounting structure according to the first embodiment, seen from a rear side in a vehicle front-rear direction.

As shown in FIG. 2, the flange portion 34C is formed into, for example, an almost H-shape when seen in the vehicle front-rear direction. Specifically, the flange portion 34C includes projecting portions 38A and projecting portions 38B. The projecting portions 38A project to the vehicle upper side and the vehicle lower side, respectively, on an inner side with respect to the center of the flange portion 34C in the vehicle width direction. The projecting portions 38B project to the vehicle upper side and the vehicle lower side, respectively, on the outer side. In the projecting portions 38A and the projecting portions 38B, four through-holes (not shown) are formed in the vehicle front-rear direction.

The crush box 34 is structured so that it is deformed in the vehicle front-rear direction when a collision load is input in the vehicle front-rear direction. Specifically, in the crush box 34, rigidity (bending rigidity) against an axial compression load along the vehicle front-rear direction is lower than that of the rear side member 32 (see FIG. 1). Also, when a rear surface collision happens to the vehicle 10, the crush box 34 is deformed before the rear side member 32 is deformed so that the crush box 34 absorbs a part of the collision energy.

Connecting Plates

As shown in FIG. 3, the connecting plate 23 is superimposed on the flange portion 34C of the crush box 34 from the vehicle rear side. The connecting plate 23 is disposed so that the vehicle front-rear direction serves as its thickness direction, and the connecting plate 23 is in contact with the flange portion 34C. Also, the size and the shape of the connecting plate 23 are set so that the connecting plate 23 covers from the projecting portions 38A through the projecting portions 38B (see FIG. 2) when seen in the vehicle front-rear direction. In the connecting plate 23, through-holes (not shown) are formed where later-described shaft portions 43 are inserted in the vehicle front-rear direction, respectively.

Bumper Reinforcement

The bumper reinforcement 24 shown in FIG. 1 is made from a high tensile strength steel sheet material. In the specification, the "high tensile strength steel sheet" means a steel sheet with tensile strength higher than that of a normal steel sheet, and is a steel sheet with tensile strength of 340 MPa or higher. Specifically, among high tensile strength steel sheets, for example, a super high tensile strength steel sheet (including a hot stamping material) with tensile strength of 980 MPa or higher is used to structure the bumper reinforcement 24. The bumper reinforcement 24 may be made from an aluminum member (an aluminum sheet). The aluminum member includes not only a member made from a single substance of aluminum, but also a member made from an aluminum alloy. The bumper reinforcement 24 may be made from a normal steel sheet.

The bumper reinforcement 24 extends in the vehicle width direction. Further, both end portions of the bumper reinforcement 24 in the vehicle width direction are mounted on the vehicle body rear members 22A, 22B through the connecting plates 23, respectively. This means that the bumper reinforcement 24 is mounted on (stretched between) the rear end portions of the right and left crush boxes 34. Here, the both end portions of the bumper reinforcement 24 in the vehicle width direction, that are also portions mounted on the crush boxes 34 through the connecting plates 23, respectively, are referred to as mounting portions 25. In other words, the mounting portions 25 are portions of the bumper reinforcement 24 that overlap the connecting plates 23 in the vehicle front-rear direction, respectively.

As shown in FIG. 3, each of the mounting portions 25 of the bumper reinforcement 24 is formed into a hat shape that is open on the vehicle front side when seen in the vehicle width direction. Specifically, when seen in the vehicle width direction, each of the mounting portions 25 includes a vertical wall portion 25A, a lower wall portion 25B, a lower flange 25C, an upper wall portion 25D, and an upper flange 25E.

The vertical wall portion 25A is disposed at a distance from and also to face the connecting plate 23, and extends in the vehicle upper-lower direction. The lower wall portion 25B extends to the vehicle front side from a lower end of the vertical wall portion 25A. The lower flange 25C extends downwardly from a front end portion of the lower wall portion 25B. The upper wall portion 25D extends to the vehicle front side from an upper end of the vertical wall portion 25A. The upper flange 25E extends upwardly from a front end portion of the upper wall portion 25D.

As shown in FIG. 2, in a view in the vehicle front-rear direction, a lower end surface of the lower flange 25C and an upper end surface of the upper flange 25E have wavy shapes that project in the vehicle upper side and the vehicle lower side, respectively, so as to match external shapes of the projecting portions 38A and the projecting portions 38B.

Figure 5:
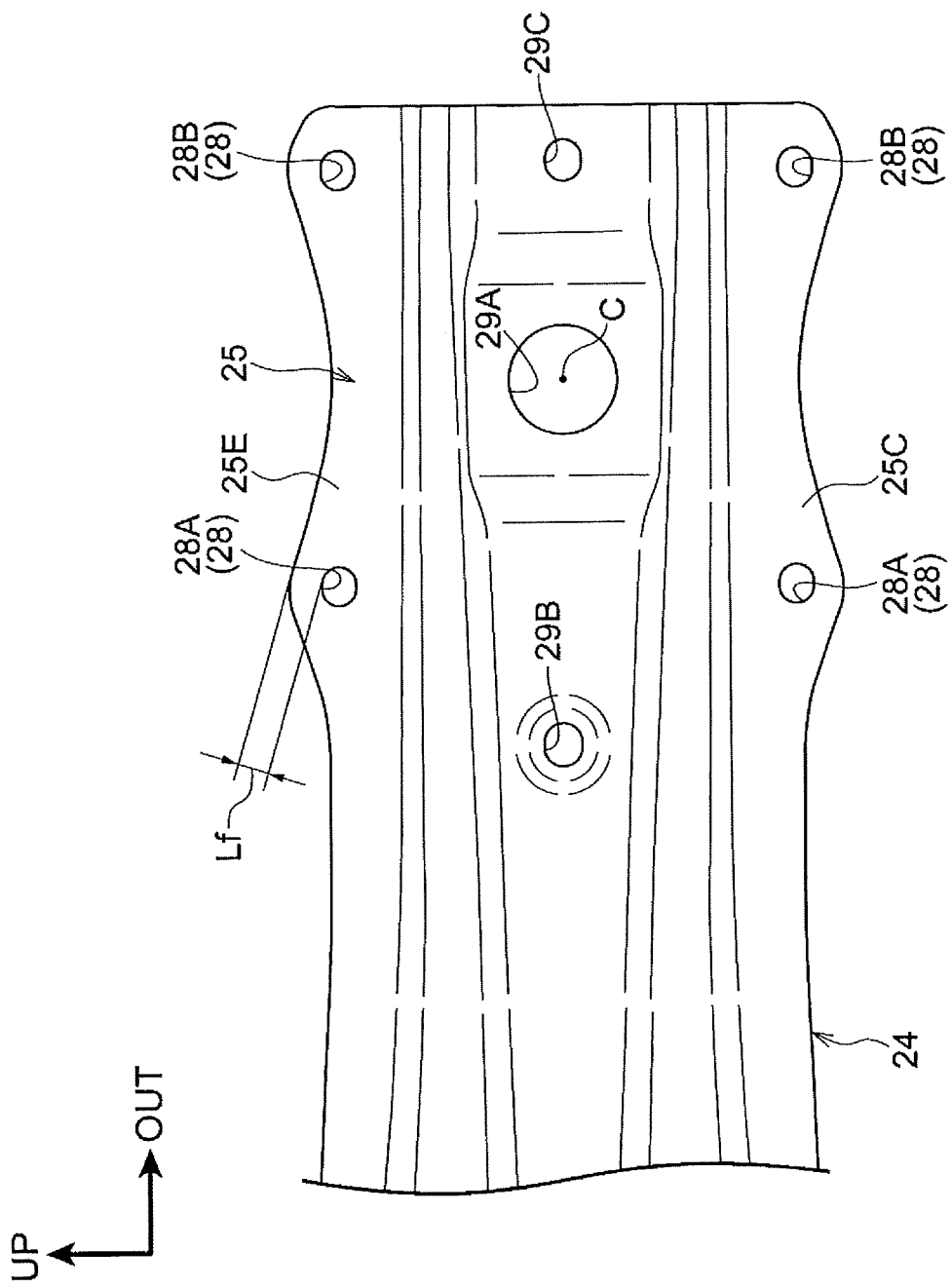
FIG. 5 is an explanatory view of a length of a flange portion in the bumper reinforcement according to the first embodiment.

Also, as shown in FIG. 5, four holes 28 are formed in the lower flange 25C and the upper flange 25E in the front-rear direction and disposed at an interval in the vehicle width direction. The holes 28 are through-holes with an almost circular shape. The two holes 28 aligned in the vehicle upper-lower direction on the inner side in the vehicle width direction with respect to a center C (shown by a point C) of each of the mounting portions 25 in the vehicle width direction and the vehicle upper-lower direction are referred to as inside holes 28A. The two holes 28 aligned in the vehicle upper-lower direction on the outer side in the vehicle width direction with respect to the center C are referred to as outside holes 28B. The inside holes 28A and the outside holes 28B have, for example, the same size and the same shape.

The shortest length between a wall of the hole 28 and an outer edge of the mounting portion 25 is regarded as a flange length Lf (unit: mm). Also, a thickness in the vehicle front-rear direction of a portion of the mounting portion 25 having the flange length Lf is regarded as t (see FIG. 3, unit: mm).

In the bumper reinforcement 24, in a center portion of each of the mounting portions 25 including the center C, a through-hole 29A is formed in which a hook for towing (not shown) is inserted. Also, a through-hole 29B and a through-hole 29C are formed in the bumper reinforcement 24 on the inner side and the outer side in the vehicle width direction with respect to the through-hole 29A, respectively. The through-hole 29B and the through-hole 29C are used for working when the bumper reinforcement 24 is assembled.

Mounting Members

The mounting members 26 shown in FIG. 3 include, for example, a bolt 42 and a weld nut 46 to which the bolt 42 is screwed, respectively. In other words, the mounting members 26 are used to mount the bumper reinforcement 24 on the vehicle body rear members 22A, 22B (see FIG. 1) as the bolts 42 and the weld nuts 46 are used for co-fastening (fastening) of the flange portions 34C, the connecting plates 23, and the mounting portions 25.

Bolts

Each of the bolts 42 is made of iron, and includes the shaft portion 43 and a head portion 44. The shaft portion 43 has an almost columnar shape and has an external thread formed on its outer peripheral surface. The head portion 44 has an outer diameter that is larger than an outer diameter of the shaft portion 43. The shaft portion 43 is an example of a breaking portion (a fragile portion) of the vehicle 10 (see FIG. 1), the broken portion being broken at the time of collision. A length of the shaft portion 43 in the axis direction is larger than a total thickness of the mounting portion 25, the connecting plate 23, and the flange portion 34C. The shaft portion 43 of the bolt 42 is inserted in each of the holes 28 (see FIG. 5).

Weld Nuts

Each of the weld nuts 46 shown in FIG. 4 is fixed to a peripheral portion of each of four through-holes (not shown) that are respectively made in the projecting portion 38A and the projecting portion 38B. The vehicle front-rear direction serves as the axis direction of the weld nuts 46. An internal thread is formed on an inner side of the weld nut 46, and the shaft portion 43 is screwed to the weld nut 46.

Shear Strength

Shear strength Ka (unit: kN) of the bolt 42 shown in FIG. 3, and shear strength Kb (unit: kN) of the bumper reinforcement 24 are compared. Material strength of the bolt 42 is regarded as Fa (unit: kN), a ratio of shear strength of the bolt 42 is regarded as Na, and an effective sectional area of a surface orthogonal to the axis direction of the bolt 42 is regarded as S (unit: $mm^2$). Further, material strength of the bumper reinforcement 24 is regarded as Fb (unit: kN), a ratio of shear strength of the bumper reinforcement 24 is regarded as Nb, a length of the mounting portion 25 of the bumper reinforcement 24 is regarded as L (unit: mm), and a plate thickness of the bumper reinforcement 24 is regarded as t (unit: mm). The length L of the mounting portions 25 is twice the flange length Lf (see FIG. 5) described above. Thus, L=2×Lf holds.

Tensile test was carried out to measure material strength by using, for example, Autograph AG-X100KN manufactured by Shimadzu Corporation. For a specimen, a JISZ2201 (Z2241) No. 5 specimen was used. A width of a parallel portion was 25 mm (+−0.05 mm), a radius of a shoulder portion was 20 mm or larger but not exceeding 25 mm, and a length of the parallel portion was 60 mm. An entire length was 180 mm, and a width was 35 mm. The test method used was JISZ2241.

The ratio of shear strength Na of the bolt 42 means a ratio of strength in a shear direction with respect to tensile strength of the bolt 42 in the axis direction. The ratio of shear strength Nb of the bumper reinforcement 24 means a ratio of strength in a shear direction with respect to strength of a sheet material in a tensile direction, the sheet material being equivalent to the mounting portion 25 of the bumper reinforcement 24. Each of the ratios of shear strength Na, Nb is set based on results of a shear test.

The shear test for the bolt 42 is carried out as follows: the shaft portion 43 of the bolt 42 is inserted into holes of two sheet-shaped jigs, and a load is applied in a direction perpendicular to the axis direction of the shaft portion 43 (the sheet-shaped jigs are pulled in a direction separating from one another). The shear test for the bumper reinforcement 24 is carried out as follows: the sheet-shaped jigs used for the shear test for the bolt 42 are replaced with a sheet material that corresponds to the mounting portion 25, and the bolt 42 is replaced with a high-strength round steel material. The shear test is carried out by using, for example, Autograph AG-X100KN manufactured by Shimadzu Corporation. It is preferred that the ratios of shear strength Na, Nb are set within a range of, for example, 0.6 or higher but not exceeding 0.8.

The shear strength Ka of the bolt 42 is obtained from Ka=Fa×Na×S. The shear strength Kb of the bumper reinforcement 24 is obtained from Kb=Fb×Nb×2×Lf×t. "2×Lf×t" means inclusion of both the flange portion on one side and the flange portion on the other side in a radial direction of the hole 28. In this embodiment, Ka<Kb holds. In other words, the material strength Fa, Fb, the ratios of shear strength Na, Nb, the effective sectional area S, the flange length Lf, and the thickness t satisfy a relation Fa×Na×S<Fb×Nb×2×Lf×t.

As described above, when a collision load is input, the bolt 42 is broken more easily compared to the bumper reinforcement 24. In other words, the bolt 42 has the shaft portion 43 that is broken earlier than the mounting portion 25 of the bumper reinforcement 24 when a collision load is input to the bumper reinforcement 24.

Actions and Effects

Next, actions and effects of the mounting structure 20 according to the first embodiment are described.

Figure 6A:
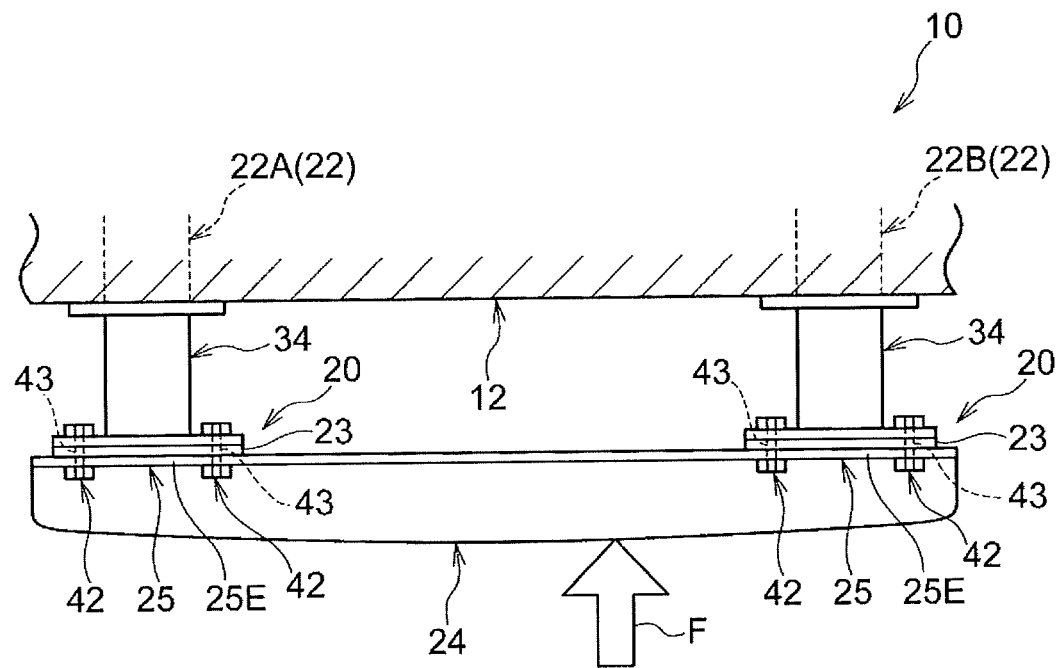
FIG. 6A is an explanatory view of a state where a collision load is input to the bumper reinforcement according to the first embodiment.

In a case where the vehicle 10 shown in FIG. 6A collides, for example, a collision load F is applied to a right side from the center of the bumper reinforcement 24 in the vehicle width direction. The input collision load F acts on the mounting portion 25 of the bumper reinforcement 24. In such a case, with deformation of the bumper reinforcement 24, shear force chiefly acts on the lower flange 25C (see FIG. 5), the upper flange 25E, and the bolts 42 of the mounting portion 25 on the right side.

Figure 6B:
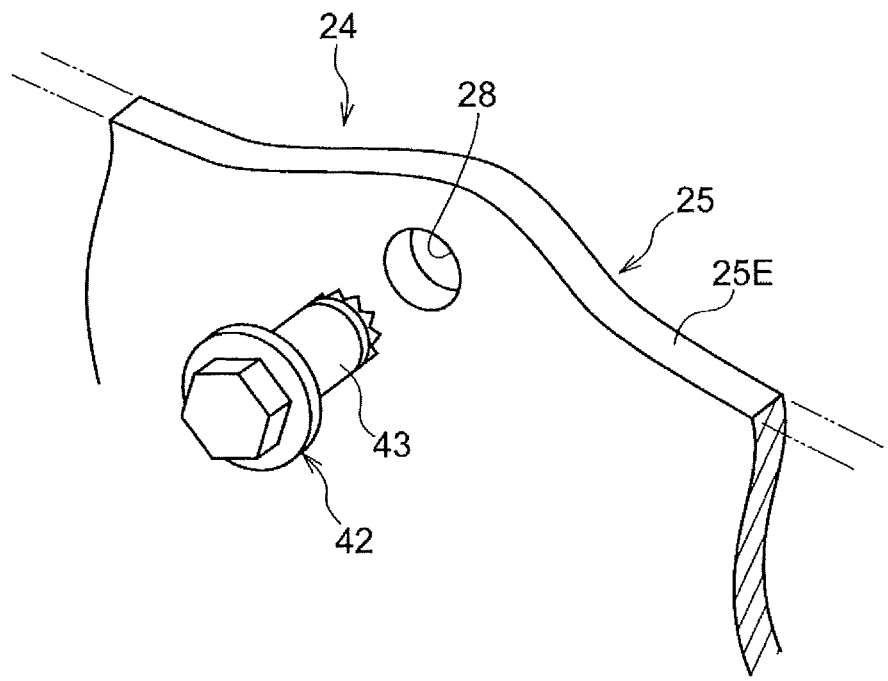
FIG. 6B is an explanatory view of a state where a bolt according to the first embodiment is fractured.

As shown in FIG. 6B, the shaft portion 43 of the bolt 42 is broken earlier than the mounting portion 25 of the bumper reinforcement 24. Thus, the mounting portion 25 (especially a portion between the hole 28 and the outer edge) is restrained from being broken due to contact with the bolt 42. Specifically, since the shear strength of the shaft portion 43 of the bolt 42 is lower than the shear strength of the mounting portion 25 of the bumper reinforcement 24, the shaft portion 43 is broken before the mounting portion 25. Therefore, not only a transmission path of the collision load F to the vehicle body rear member 22B on the right from the bumper reinforcement 24 shown in FIG. 6A, but also a transmission path of the collision load F to the vehicle body rear member 22A on the left is ensured. Thus, it is possible to restrain a reduction of the collision load F transmitted to the vehicle body rear members 22 from the bumper reinforcement 24 at the time of collision.

Further, as the collision load F is transmitted to the vehicle body rear members 22 from the bumper reinforcement 24, the crush boxes 34 are compressed and deformed in the axis direction (the vehicle front-rear direction) and absorb collision energy. Since each of the crush boxes 34 is interposed between the bumper reinforcement 24 and the rear side member 32 even after the compressive deformation at the time of collision, it is possible to reduce shear force acting on each of the mounting members 26 in comparison with a configuration without the crush boxes 34.

Also, in the mounting structure 20, as the bolts 42 are inserted in the holes 28 (see FIG. 6B) of the mounting portions 25 of the bumper reinforcement 24, respectively, the bumper reinforcement 24 is mounted on the vehicle body rear members 22. Thus, the configuration of the mounting members 26 is simpler compared to a configuration without the bolts 42.

Further, in the mounting structure 20, based on the relation $Fa \times Na \times S < Fb \times Nb \times 2 \times Lf \times t$, the shear strength of the bolts 42 is controlled so as to be smaller than the shear strength of the mounting portions 25 of the bumper reinforcement 24. Thus, it is possible to ensure that the bolts 42 are broken earlier than the mounting portions 25 of the bumper reinforcement 24 at the time of collision.

Second Embodiment

Next, an example of a bumper reinforcement mounting structure according to a second embodiment is described. The members and portions that are basically the same as those of the first embodiment are denoted by the same reference numerals as those in the first embodiment, and the description is omitted.

Figure 7:
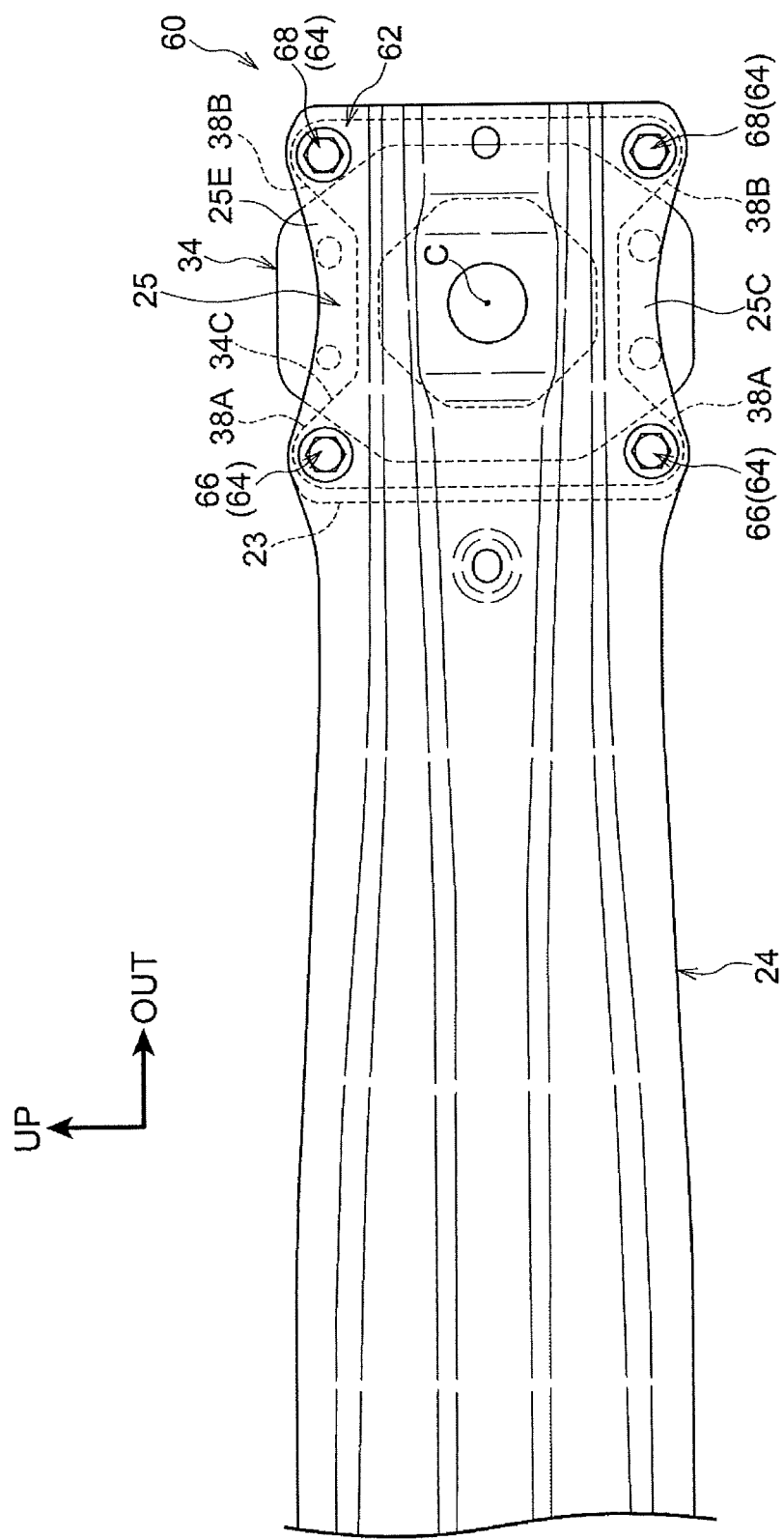
FIG. 7 is an explanatory view of a mounting structure according to a second embodiment, seen from the rear side in the vehicle front-rear direction.

FIG. 7 shows a mounting structure 60 as an example of the bumper reinforcement mounting structure according to the second embodiment. The mounting structure 60 has a configuration in which the mounting structure 20 (see FIG. 2) of the vehicle 10 according to the first embodiment is provided with mounting members 62 instead of the mounting members 26 (see FIG. 3). In the mounting structure 60, the projecting portions 38A of the crush box 34 are an example of first mounted portions on an inner side with respect to the center C in the vehicle width direction, and the projecting portions 38B on an outer side with respect to the center C in the vehicle width direction are an example of second mounted portions.

Each of the mounting members 62 includes, for example, a bolt 64 and the weld nut 46 (see FIG. 8) to which the bolt 64 is screwed. In other words, the mounting members 62 are used to mount the bumper reinforcement 24 on the vehicle body rear members 22 as the bolts 64 and the weld nuts 46 are used for co-fastening (fastening) of the flange portions 34C, the connecting plates 23, and the mounting portions 25.

Specifically, the bolts 64 include the first bolts 66 having first shear strength Ka1 (unit: kN), and second bolts 68 having second shear strength Ka2 (unit: kN) higher than the first shear strength Ka1. A calculation method for the first shear strength Ka1 and the second shear strength Ka2 is the same as that for the shear strength Ka described earlier, and the description thereof is thus omitted.

Figure 8:
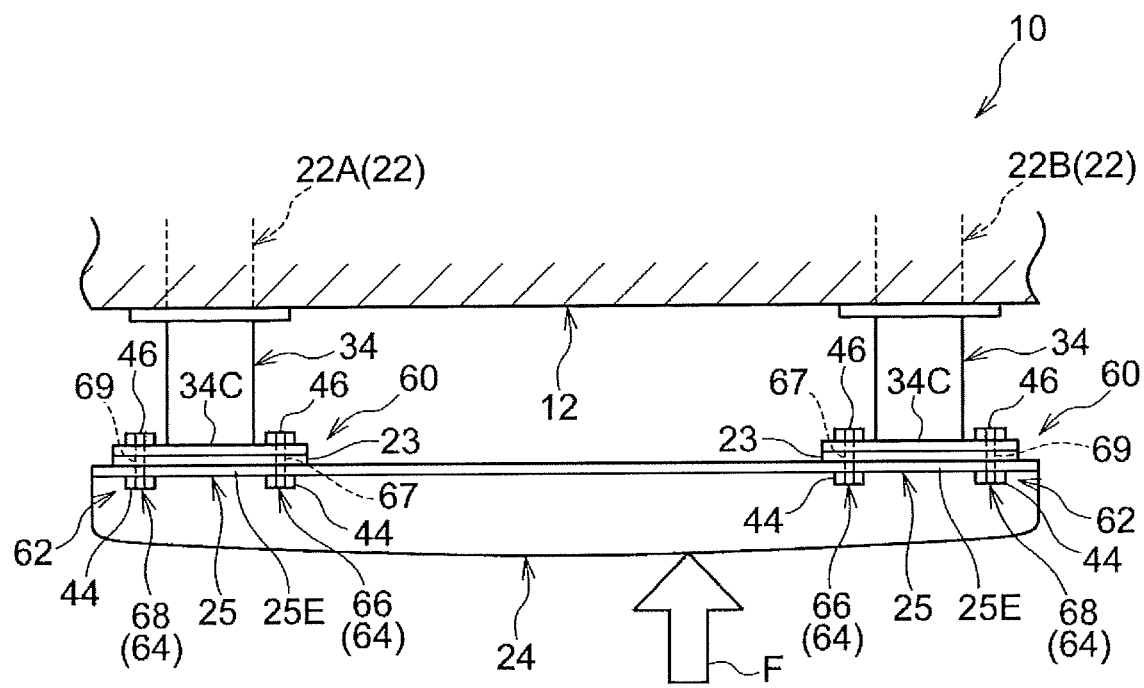
FIG. 8 is an explanatory view of a state where a collision load is input to a bumper reinforcement according to the second embodiment.

Each of the first bolts 66 shown in FIG. 8 includes a head portion 44, and a shaft portion 67 as an example of the breaking portion (the fragile portion), and is used when the bumper reinforcement 24 is mounted on the projecting portion 38A (see FIG. 7). Each of the second bolts 68 includes a head portion 44 and a shaft portion 69, and is used when the bumper reinforcement 24 is mounted on the projecting portion 38B (see FIG. 7). In other words, the bumper reinforcement 24 is mounted on the projecting portions 38A by the first bolts 66, and the bumper reinforcement 24 is mounted on the projecting portions 38B by the second bolts 68.

The first shear strength Ka1 of the shaft portion 67 of each of the first bolts 66 is set so as to be lower than shear strength Kb of the mounting portion 25 of the bumper reinforcement 24. The second shear strength Ka2 of the shaft portion 69 of each of the second bolts 68 is set so as to be higher than the shear strength Kb. Thus, magnitudes of the shear strength are expressed as Ka1<Kb<Ka2.

Actions and Effects

Next, actions and effects of the mounting structure 60 according to the second embodiment are described.

When the vehicle 10 having the mounting structure 60 shown in FIG. 8 collides, it is assumed that, for example, a collision load F is input to a right side of a center of the bumper reinforcement 24 in the vehicle width direction. The collision load F that is input acts on the mounting portions 25 of the bumper reinforcement 24. In that case, with deformation of the bumper reinforcement 24, shear force chiefly acts on the lower flange 25C (see FIG. 7), the upper flange 25E, and the bolts 64 of the mounting portion 25 on the right side.

Since the shaft portion 67 of the first bolt 66 is broken earlier than the mounting portion 25 of the bumper reinforcement 24, the mounting portion 25 is restrained from being broken due to contact with the first bolt 66. Specifically, since shear strength of the shaft portion 67 of the first bolt 66 is lower than shear strength of the mounting portion 25 of the bumper reinforcement 24, the shaft portion 67 is broken earlier than the mounting portion 25. Therefore, not only a transmission path of the collision load F to the vehicle body rear member 22B on the right from the bumper reinforcement 24, but also a transmission path of the collision load F to the vehicle body rear member 22A on the left are ensured. Thus, it is possible to restrain a reduction of the collision load F transmitted to the vehicle body rear members 22 from the bumper reinforcement 24 at the time of collision.

Further, in the mounting structure 60, the second shear strength Ka2 of the shaft portion 69 of each of the second bolts 68 is higher than the first shear strength Ka1 of the shaft portion 67 of each of the first bolts 66. Therefore, even when the first bolts 66 are broken at the time of collision, the second bolts 68 are restrained from breaking. Thus, it is possible to ensure that the collision load F is transmitted to the vehicle body rear members 22 from the bumper reinforcement 24 while restraining breakage of the mounting portions 25 of the bumper reinforcement 24.

Further, in the mounting structure 60, the second shear strength Ka2 of the shaft portion 69 of each of the second bolts 68 is higher than the shear strength Kb of the mounting portion 25 of the bumper reinforcement 24. Therefore, breakage of the second bolts 68 is restrained unless the mounting portion 25 of the bumper reinforcement 24 is broken. Therefore, compared to a configuration in which the first bolts 66 and the second bolts 68 are broken at the time of collision, it is possible to further restrain a reduction of the collision load F transmitted to the vehicle body rear members 22 from the bumper reinforcement 24 at the time of collision.

In the mounting structure 20, the mounting members 26 are not limited to the bolts 42 and the weld nuts 46, and may be, for example, rivets each having a shaft portion. The rivets are used to mount a member by being riveted. The shaft portion is an example of the breaking portion (the fragile portion). Also, a nut to which each of the bolts 42 is fastened is not limited to the weld nut 46, and may be a nut that is not fixed. Moreover, the weld nuts 46 may not be used, and each of the bolts 42 may be fastened to a hole having an internal thread instead. The hole is formed on the vehicle body rear member 22 side so as to mount a member.

Further, in the mounting structure 20, the relation Fa×Na×S<Fb×Nb×2×L×t may not be satisfied as long as the mounting member 26 is broken earlier than the mounting portion 25 when a collision load is input. In addition, the crush boxes 34, and the connecting plates 23 may not be provided in the mounting structure 20. Thus, the bumper reinforcement 24 may be mounted directly on the rear side members 32.

In the mounting structure 60, the shear strength of each of the second bolts 68 may be equal to or smaller than the shear strength of the mounting portion 25 of the bumper reinforcement 24.

The bumper reinforcement 24 is not limited to the one provided on the rear side of the vehicle 10, and may be one that is provided on the front side. Also, in the bumper reinforcement 24, the shapes of the lower end surface of the lower flange 25C and the upper end surface of the upper flange 25E are not limited to the wavy shapes, and may be a polygonal shape. The shape of the holes 28 is not limited to a circular shape, and may be an ellipse. As a method for increasing the shear strength of the mounting portion 25 of the bumper reinforcement 24 so as to be higher than the shear strength of each of the bolts 42, for example, there is a method in which the flange length Lf is set to be longer.

Collision in which the collision load F is input to the vehicle 10 is not limited to simple offset collision, and may also be full overlap collision in which the entire front surface of the vehicle 10 collides. Further, offset collision may be small overlap collision in which an outer side of the side member in the vehicle width direction collides.

What is claimed is:

1. A bumper reinforcement mounting structure comprising:
    a plurality of vehicle body skeleton members disposed at an interval in a vehicle width direction and extending in a vehicle front rear direction;
    a bumper reinforcement that extends in the vehicle width direction and is mounted on the vehicle body skeleton members; and
    a first mounting member configured to secure the bumper reinforcement on one of the vehicle body skeleton members, the first mounting member configured to be broken earlier than a mounting portion of the bumper reinforcement mounted on the plurality of vehicle body skeleton members when a collision load is input to the bumper reinforcement.

2. The bumper reinforcement mounting structure according to claim 1, wherein
    the first mounting member includes a first bolt and the mounting portion has a hole, the first bolt being inserted in the hole.

3. The bumper reinforcement mounting structure according to claim 2, wherein
    Fa×Na×S<Fb×Nb×2×L×t is satisfied when Fa is material strength of the first bolt, Na is a ratio of shear strength of the first bolt, S is an effective sectional area of the first bolt, Fb is material strength of the bumper reinforcement, Nb is a ratio of shear strength of the bumper reinforcement, L is a length of the mounting portion of the bumper reinforcement, and t is a plate thickness of the bumper reinforcement.

4. The bumper reinforcement mounting structure according to claim 2, further comprising a second mounting member that is used to mount the bumper reinforcement on the one of the vehicle body skeleton members and has a second bolt, wherein:
    the one of the vehicle body skeleton members includes a first mounted portion positioned on an inner side in the vehicle width direction with respect to a center of the mounting portion of the bumper reinforcement in the vehicle width direction, and a second mounted portion positioned on an outer side in the vehicle width direction with respect to the center of the mounting portion of the bumper reinforcement in the vehicle width direction,
    first shear strength of the first bolt is lower than second shear strength of the second bolt, and
    the bumper reinforcement is mounted on the first mounted portion by the first bolt, and is mounted on the second mounted portion by the second bolt.

5. The bumper reinforcement mounting structure according to claim 4, wherein
    the first shear strength of the first bolt is lower than shear strength of the mounting portion of the bumper reinforcement.

6. The bumper reinforcement mounting structure according to claim 4, wherein
    the second shear strength of the second bolt is higher than shear strength of the mounting portion of the bumper reinforcement.

7. The bumper reinforcement mounting structure according to claim 1, wherein:
    each of the vehicle body skeleton members includes a side member extending in the vehicle front rear direction, and a crush box that is mounted on a distal end portion of the side member in the vehicle front rear direction and deformed due to an input of a collision load, and the bumper reinforcement is mounted on the crush box.

8. The bumper reinforcement mounting structure according to claim 1, wherein
the bumper reinforcement is made of a high tensile strength steel sheet or an aluminum member.

9. A bumper reinforcement mounting structure comprising:
a plurality of vehicle body skeleton members disposed at an interval in a vehicle width direction and extending in a vehicle front rear direction;
a bumper reinforcement that extends in the vehicle width direction and is mounted on the vehicle body skeleton members; and
a first mounting member that is configured to secure a mounting portion of the bumper reinforcement on one of the vehicle body skeleton members, the first mounting member having shear strength that is lower than shear strength of the mounting portion of the bumper reinforcement.

10. The bumper reinforcement mounting structure according to claim 9, wherein
the first mounting member includes a first bolt and the mounting portion has a hole, the first bolt being inserted in the hole.

11. The bumper reinforcement mounting structure according to claim 10, wherein
Fa×Na×S<Fb×Nb×2×L×t is satisfied when Fa is material strength of the first bolt, Na is a ratio of shear strength of the first bolt, S is an effective sectional area of the first bolt, Fb is material strength of the bumper reinforcement, Nb is a ratio of shear strength of the bumper reinforcement, L is a length of the mounting portion of the bumper reinforcement, and t is a plate thickness of the bumper reinforcement.

12. The bumper reinforcement mounting structure according to claim 10, further comprising:
a second mounting member that is used to mount the bumper reinforcement on the one of the vehicle body skeleton members and has a second bolt, wherein:
the one of the vehicle body skeleton members includes a first mounted portion positioned on an inner side in the vehicle width direction with respect to a center of the mounting portion of the bumper reinforcement in the vehicle width direction, and a second mounted portion positioned on an outer side in the vehicle width direction with respect to the center of the mounting portion of the bumper reinforcement in the vehicle width direction,
first shear strength of the first bolt is lower than second shear strength of the second bolt, and
the bumper reinforcement is mounted on the first mounted portion by the first bolt, and is mounted on the second mounted portion by the second bolt.

13. The bumper reinforcement mounting structure according to claim 12, wherein
the first shear strength of the first bolt is lower than the shear strength of the mounting portion of the bumper reinforcement.

14. The bumper reinforcement mounting structure according to claim 12, wherein
the second shear strength of the second bolt is higher than the shear strength of the mounting portion of the bumper reinforcement.

15. The bumper reinforcement mounting structure according to claim 9, wherein:
each of the vehicle body skeleton members includes a side member extending in the vehicle front rear direction, and a crush box that is mounted on a distal end portion of the side member in the vehicle front rear direction and deformed due to an input of a collision load, and
the bumper reinforcement is mounted on the crush box.

16. The bumper reinforcement mounting structure according to claim 9, wherein
the bumper reinforcement is made of a high tensile strength steel sheet or an aluminum member.

17. The bumper reinforcement mounting structure according to claim 1, wherein the first mounting member includes a first bolt.

18. The bumper reinforcement mounting structure according to claim 1, wherein the first mounting member overlaps the bumper reinforcement in a front view.

* * * * *